(12) United States Patent
Mohns et al.

(10) Patent No.: US 11,178,807 B1
(45) Date of Patent: Nov. 23, 2021

(54) PORTABLE FLUID TANK APPARATUS FOR SEED CARTS

(71) Applicants: Brad Mohns, Jackson, MN (US); Nicholas P. Hodnefield, Lakefield, MN (US); Chad Mohns, Jackson, MN (US)

(72) Inventors: Brad Mohns, Jackson, MN (US); Nicholas P. Hodnefield, Lakefield, MN (US); Chad Mohns, Jackson, MN (US)

( * ) Notice: Subject to any disclaimer, the term of this patent is extended or adjusted under 35 U.S.C. 154(b) by 0 days.

(21) Appl. No.: 16/048,842

(22) Filed: Jul. 30, 2018

Related U.S. Application Data

(60) Provisional application No. 62/539,225, filed on Jul. 31, 2017.

(51) Int. Cl.
*A01C 23/00* (2006.01)
*B05B 1/00* (2006.01)

(52) U.S. Cl.
CPC ............... *A01C 23/00* (2013.01); *B05B 1/00* (2013.01)

(58) Field of Classification Search
USPC ........................................................ 141/231
See application file for complete search history.

(56) References Cited

U.S. PATENT DOCUMENTS

| | | | | |
|---|---|---|---|---|
| 1,861,520 | A * | 6/1932 | Arnold | A47B 81/06 |
| | | | | 312/276 |
| 2,498,229 | A * | 2/1950 | Adler | B60P 3/14 |
| | | | | 141/26 |
| 4,585,266 | A * | 4/1986 | Steinberg | A01C 3/06 |
| | | | | 105/377.05 |
| 9,505,583 | B1 * | 11/2016 | Hellbusch | B65H 75/425 |
| 2010/0101659 | A1 * | 4/2010 | Trattner | B67D 7/04 |
| | | | | 137/87.03 |
| 2011/0048572 | A1 * | 3/2011 | Batson | B64F 1/28 |
| | | | | 141/1 |
| 2016/0167806 | A1 * | 6/2016 | Rice | B64F 1/28 |
| | | | | 141/231 |

* cited by examiner

*Primary Examiner* — Daphne M Barry
(74) *Attorney, Agent, or Firm* — Jeffrey A. Proehl; Woods, Fuller, Shultz & Smith, PC

(57) ABSTRACT

A portable fluid tank apparatus for removably mounting on supports for a bulk seed container of a seed cart may include a pedestal configured for resting on the container supports of a seed cart in a seed box support position, a tank housing located on a portion of the pedestal and defining a tank chamber configured to hold a liquid, and an accessory housing located on another portion of the pedestal and defining an accessory compartment configured to hold at least one accessory. The accessory housing may include a base portion mounted on the pedestal and defining an opening for accessing the accessory compartment, and a lid portion mounted on the base portion and being movable with respect to the base portion between a closed position restricting access to the accessory compartment through the opening and an open position permitting access to the accessory compartment through the opening.

19 Claims, 9 Drawing Sheets

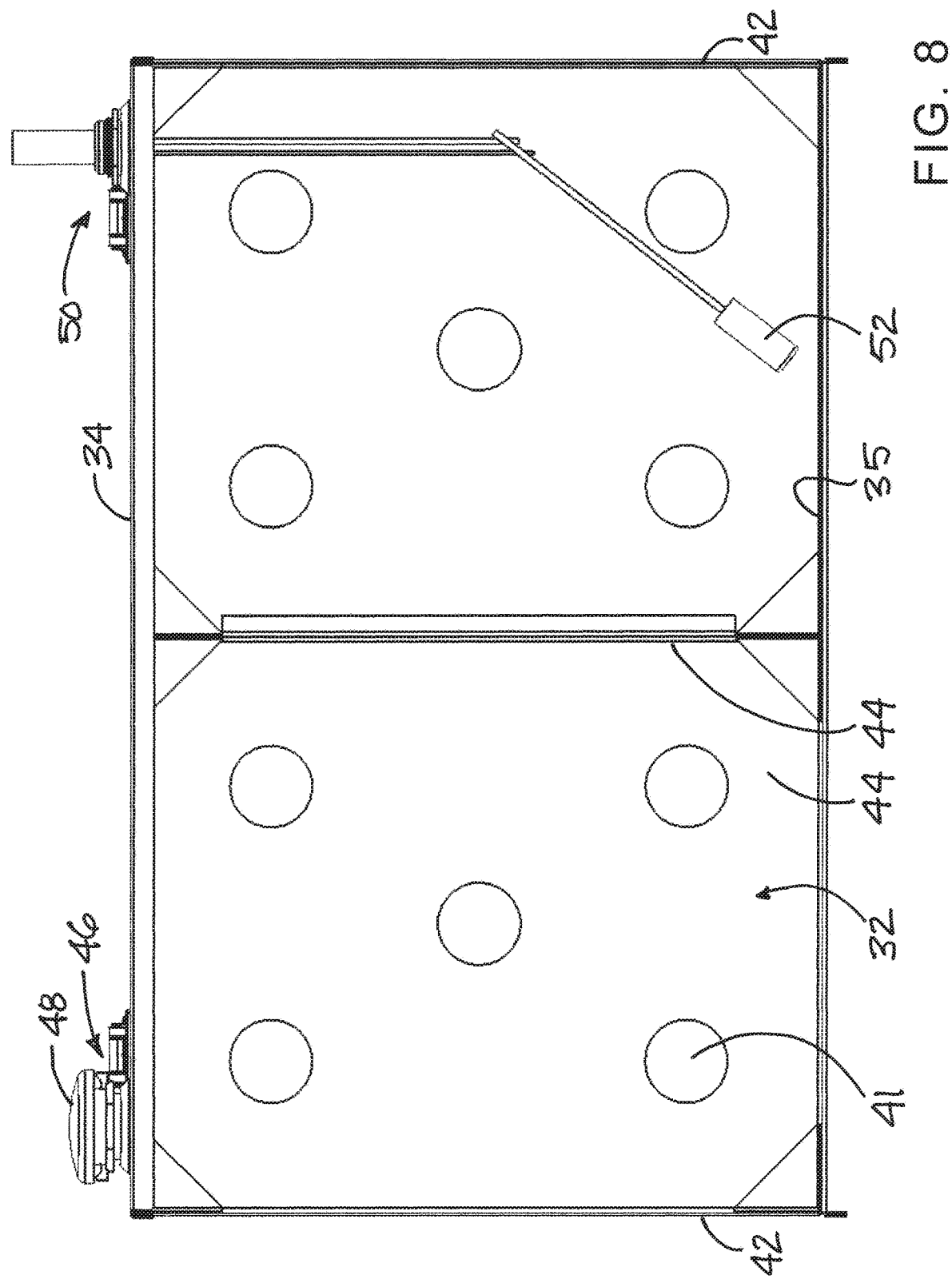

PORTABLE FLUID TANK APPARATUS FOR SEED CARTS

REFERENCE TO RELATED APPLICATIONS

This application claims the benefit of U.S. Provisional Patent Application No. 62/539,225, filed Jul. 31, 2017, which is hereby incorporated by reference in its entirety.

BACKGROUND

Field

The present disclosure relates to seed cart accessories and more particularly pertains to a new portable fluid tank apparatus for seed carts for providing additional cargo transport options on seed carts.

SUMMARY

In one aspect, the present disclosure relates to a portable fluid tank apparatus for removably mounting on supports for a bulk seed container of a seed cart. The tank apparatus may comprise a pedestal configured for resting on the container supports of a seed cart in a seed box support position, a tank housing located on a portion of the pedestal and defining a tank chamber configured to hold a liquid, and an accessory housing located on another portion of the pedestal and defining an accessory compartment configured to hold at least one accessory. The accessory housing may comprise a base portion mounted on the pedestal and defining an opening for accessing the accessory compartment, and a lid portion mounted on the base portion and being movable with respect to the base portion between a closed position restricting access to the accessory compartment through the opening and an open position permitting access to the accessory compartment through the opening.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 8 is a schematic rear view of the tank apparatus shown with the perimeter extent of the tank housing removed to reveal detail of the tank chamber of an illustrative embodiment with baffle walls and a gauge assembly.

DETAILED DESCRIPTION

Figure 1A:
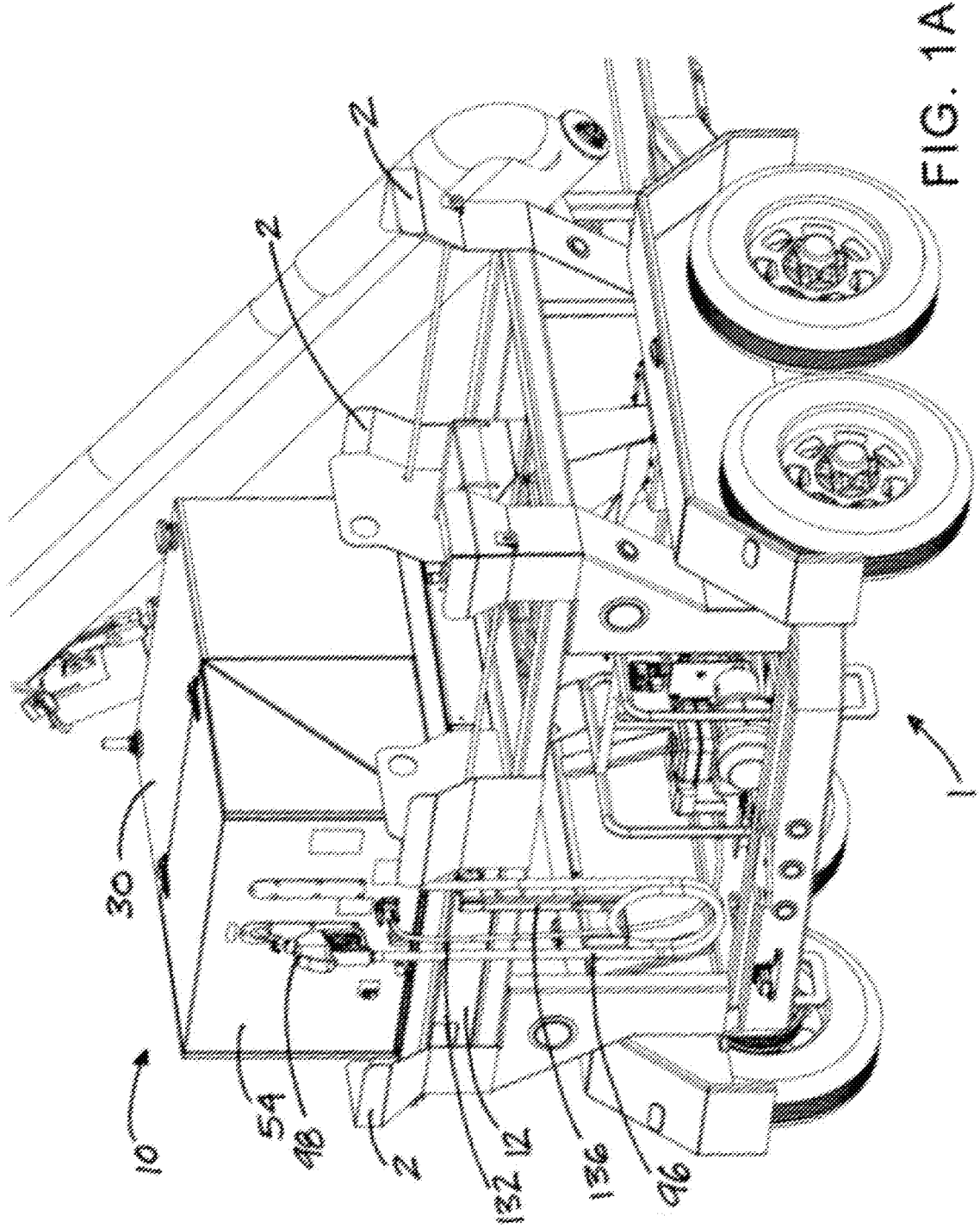
FIG. 1A is a schematic perspective view of a new portable fluid tank apparatus according to the present disclosure shown on a seed cart in a configuration for dispensing fluid.
Figure 1B:
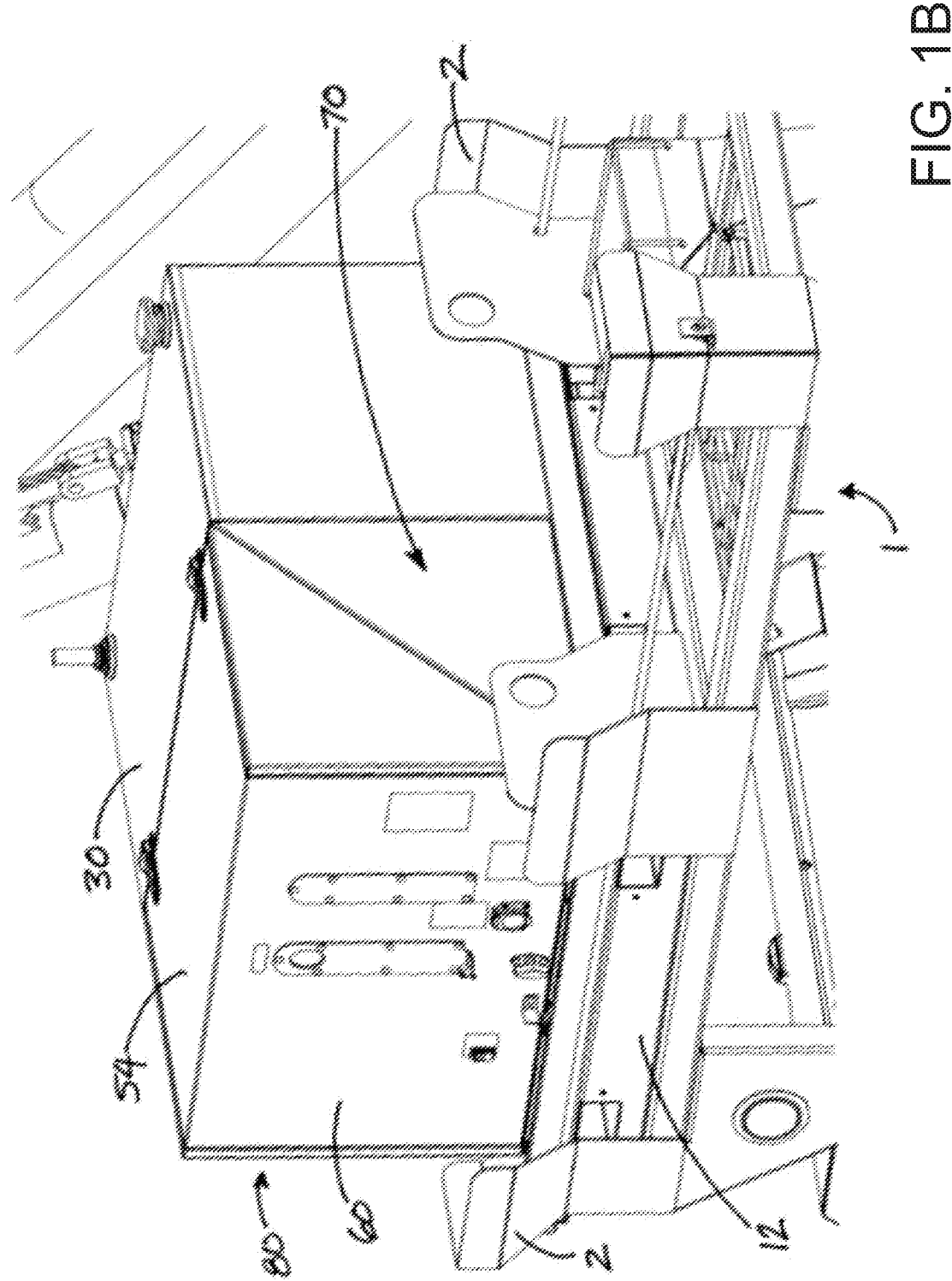
FIG. 1B is a schematic perspective view of the portable fluid tank apparatus according to the present disclosure shown on a seed cart in a configuration for transport or travel on the seed cart.
Figure 2:
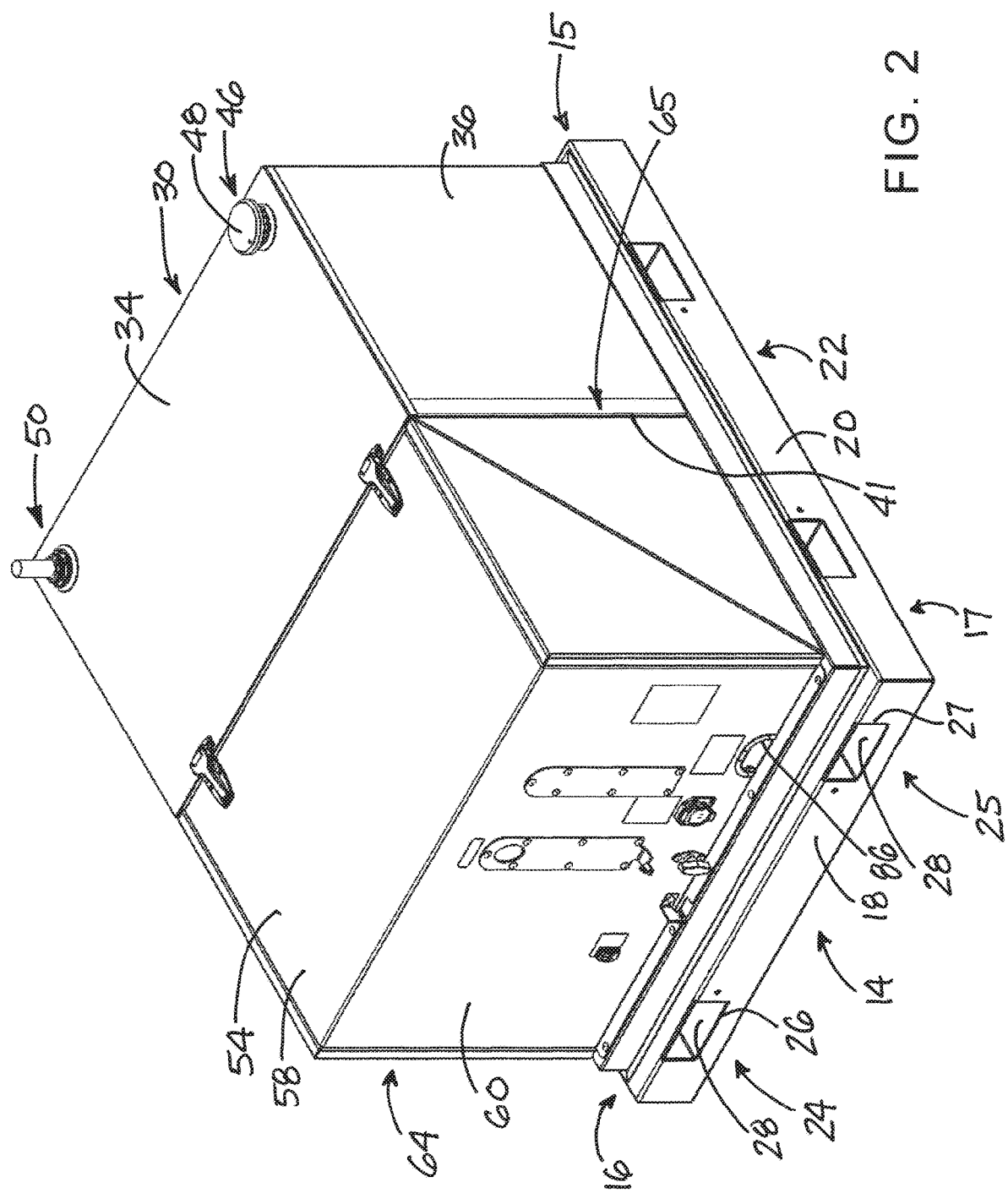
FIG. 2 is a schematic perspective view of the tank apparatus in the transport configuration, according to an illustrative embodiment.
Figure 3:
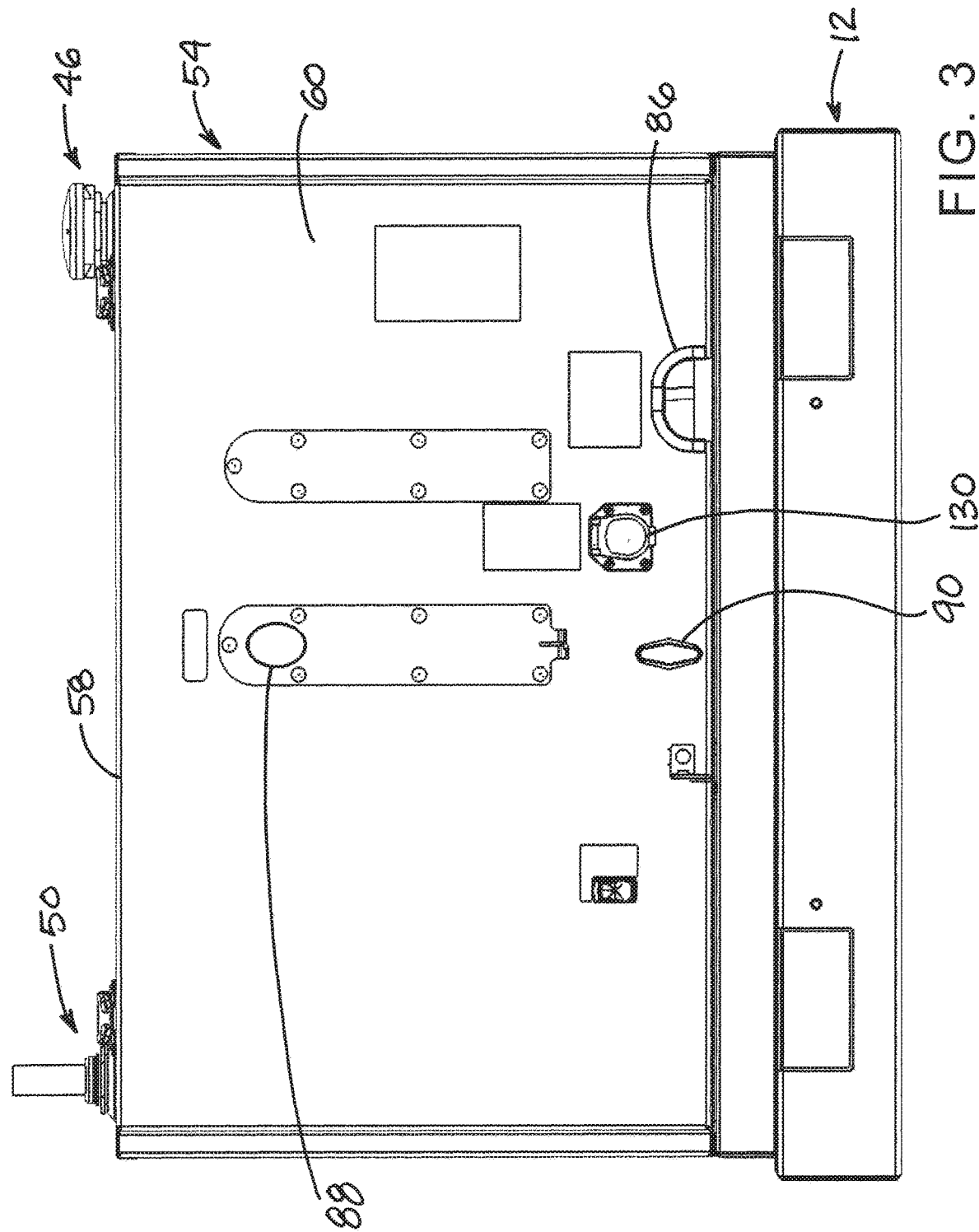
FIG. 3 is a schematic front view of the tank apparatus in the transport configuration, according to an illustrative embodiment.
Figure 4:
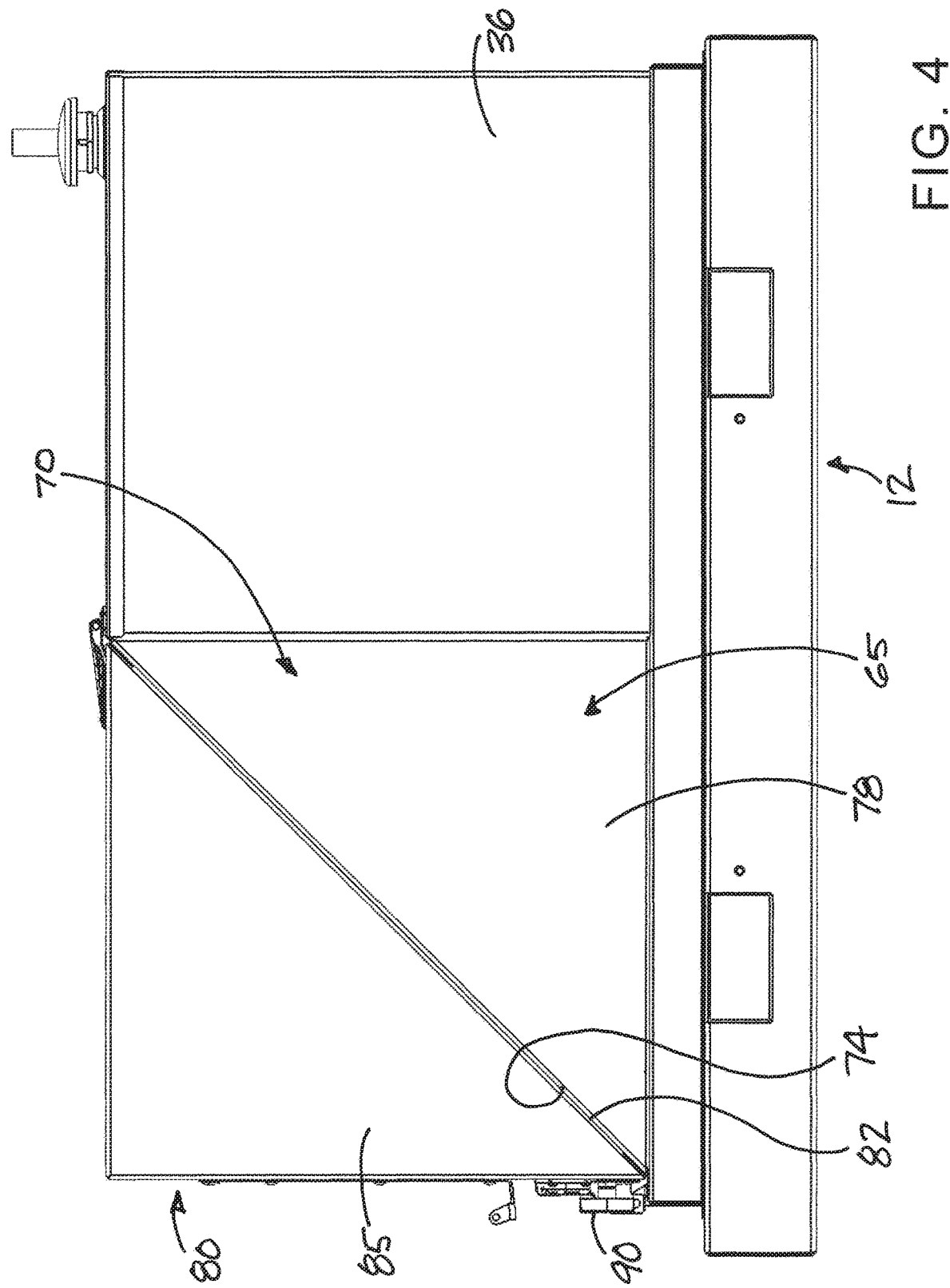
FIG. 4 is a schematic side view of the tank apparatus, according to an illustrative embodiment.
Figure 5:
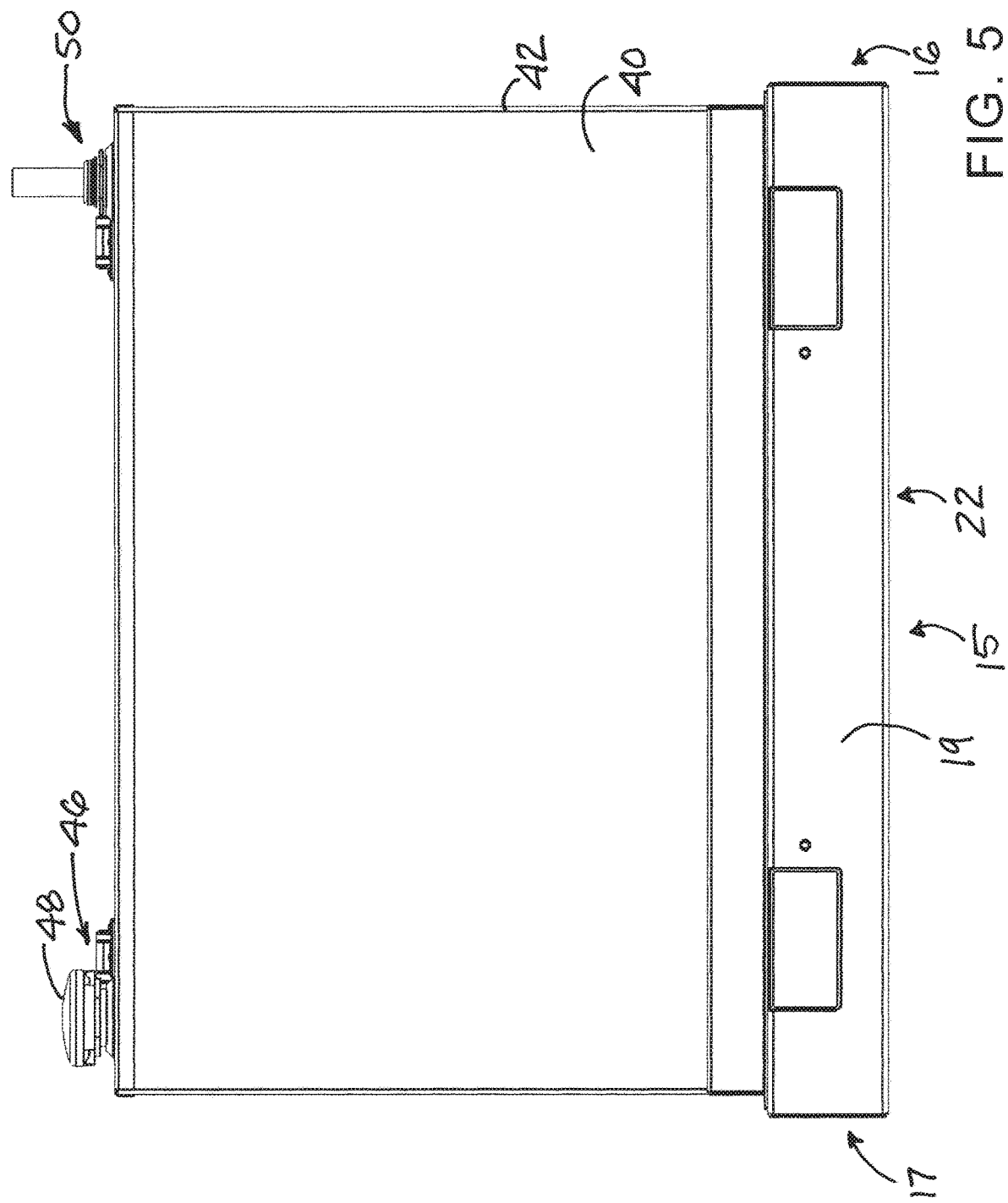
FIG. 5 is a schematic rear view of the tank apparatus, according to an illustrative embodiment.
Figure 6:
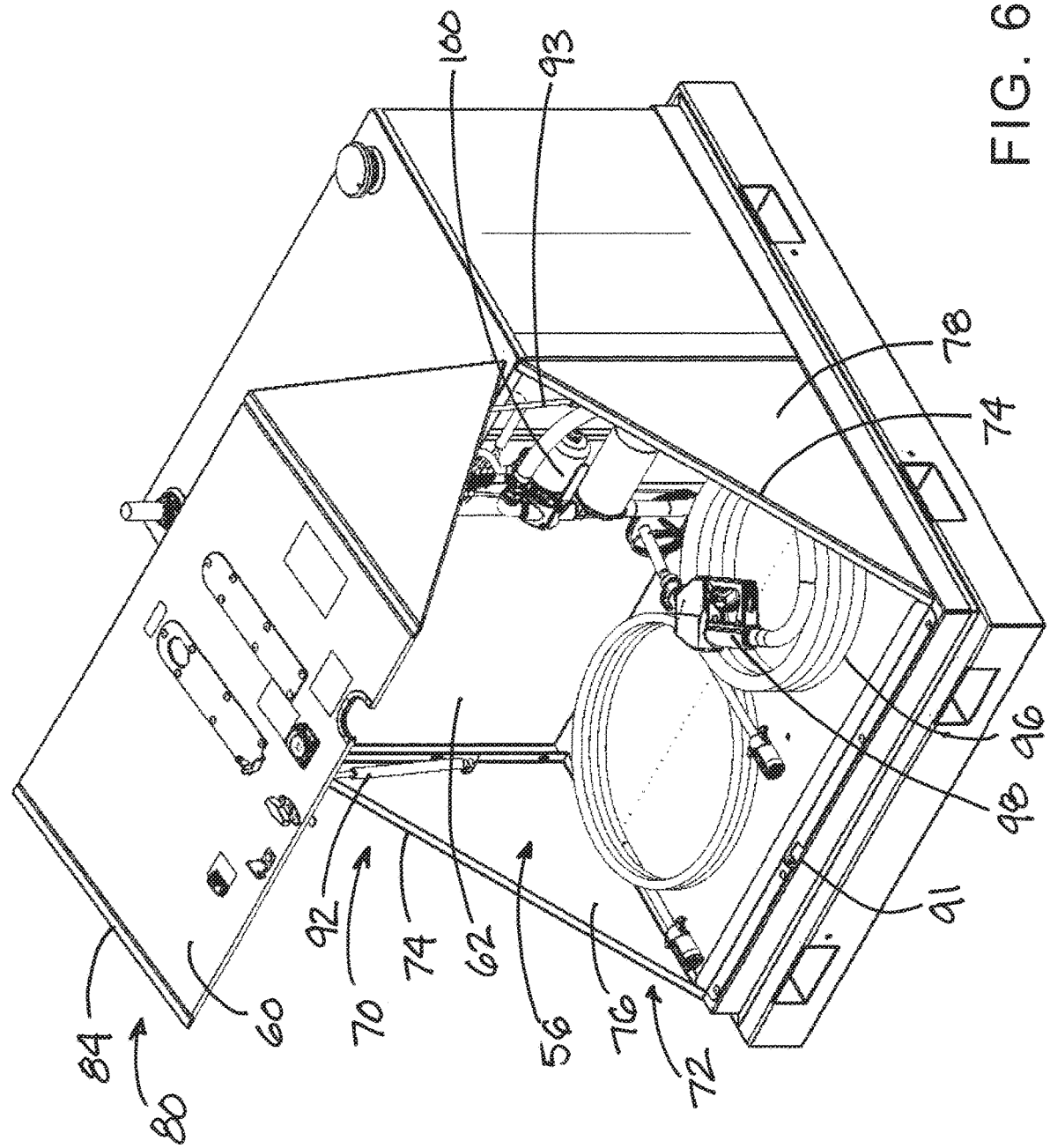
FIG. 6 is a schematic perspective view of the tank apparatus with the lid portion of the accessory housing in an open condition, according to an illustrative embodiment.
Figure 7:
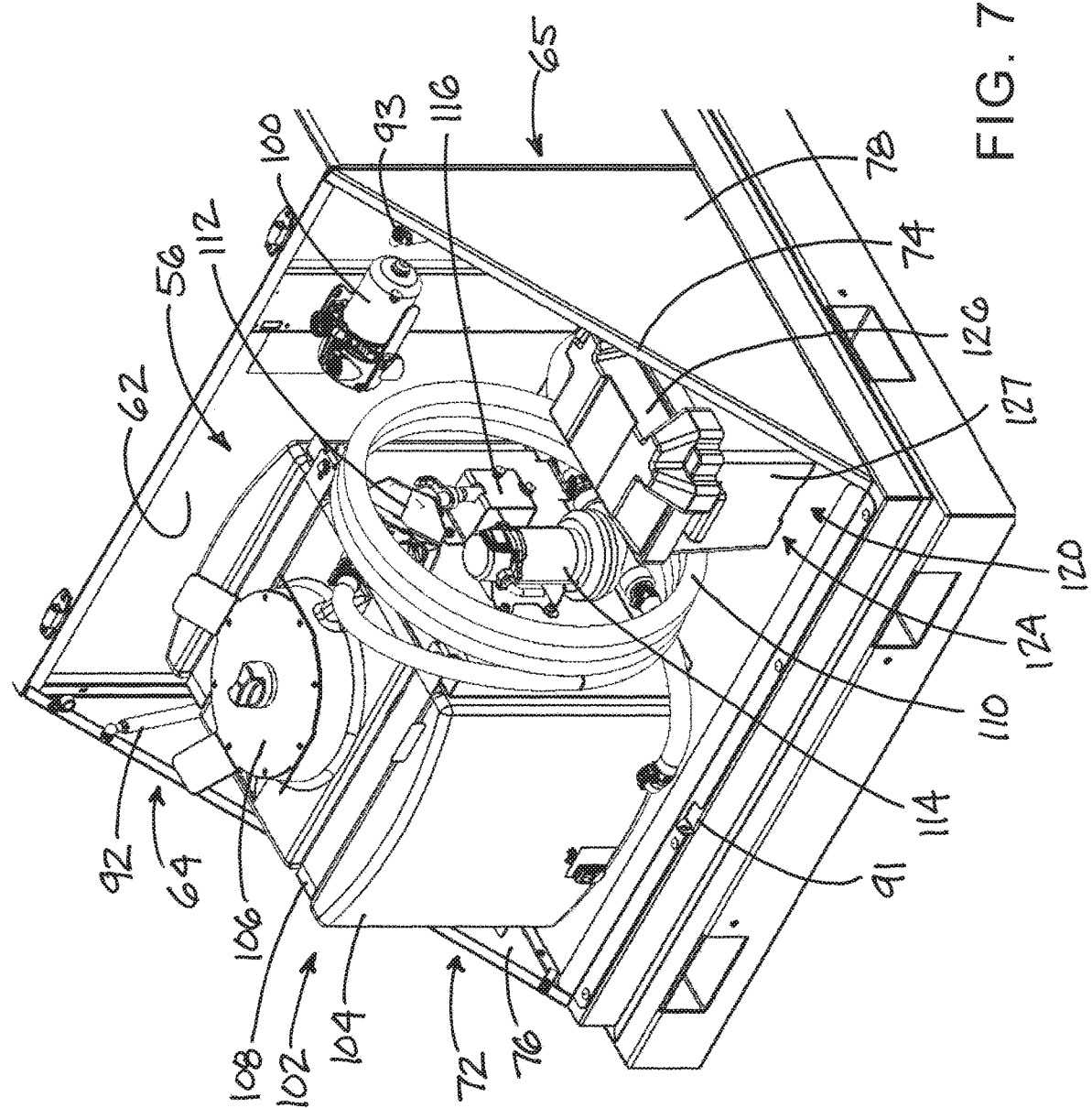
FIG. 7 is a schematic perspective view of the tank apparatus with the lid portion of the accessory housing removed to reveal detail of an illustrative embodiment with an auxiliary tank assembly.

With reference now to the drawings, and in particular to FIGS. 1 through 8 thereof, a new portable fluid tank apparatus for seed carts embodying the principles and concepts of the disclosed subject matter will be described.

Seed carts or seed tenders have been developed to conveniently transport bulk seed container into the agricultural field and dispense the seed into the hoppers of agricultural planter implements without having to utilize and discard countless seed bags. Typically, a seed cart includes the capacity to carry more than one of the relatively standardized bulk seed containers to permit greater carrying capacity as well as provide the option to carry different types of seed if desired. Due to the rather specialized structure needed on the cart to support the bulk seed containers as well as dispense the seed from the bottom of the container, one or more of the bulk seed container positions on the cart can sit empty if not otherwise utilized to hold one of the bulk seed containers as a support structure is relatively open and thus relatively useless for other purposes.

The applicants have recognized that open bulk seed container positions on a seed cart represent potential carrying capacity for other useful purposes including transporting other items useful in the field, but the standard configuration suitable for supporting and emptying a bulk seed container makes the container position relatively difficult to utilize. The applicants have thus developed a new portable fluid tank apparatus that is highly suitable for being removably supported on the container supports for a bulk seed container on a seed cart which allows the seed container position, not otherwise being utilized to support a seed container, to be used for carrying other cargo, such as, for example, fluids useful in the agricultural field such as vehicle fuel and diesel exhaust fluid (DEF) containing urea utilized in diesel-powered vehicles. In addition to vehicle-related fluids, other fluids may also be carried by the tank apparatus, such as, for example, agricultural chemicals and fertilizers. One skilled in the art will recognize that other types of fluids may be contained and dispensed by the tank apparatus. In some embodiments, more than one tank apparatus may be utilized on the multiple seed container positions of the seed cart, optionally with one tank apparatus with a fluid pump acting as a master unit and one or more other tank apparatus (without a fluid pump) acting as slave units holding fluid that may be pumped by the pump of the master unit.

In some aspects, the disclosure is directed to a portable fluid tank apparatus 10 for removably mounting on a seed cart 1, and the apparatus 10 may be configured to be positioned on the seed cart in place of a bulk seed container. The seed cart 1 may include a plurality of bulk seed container supports at each container position which are configured to interchangeably support a bulk seed container or the portable fluid tank apparatus 10 without modifying the container supports or other aspects of the container position. The apparatus 10 may thus have a footprint which is similar to a bulk seed container. The tank apparatus 10 may have a dispensing configuration suitable for dispensing fluid from the apparatus, and a transport configuration suitable for transport of the apparatus on the seed cart, such as on roads and highways.

The fluid tank apparatus 10 may include a pedestal 12 which is configured for resting on the container supports 2 of a seed cart in one of the seed box support positions defined by a plurality of the container supports (usually four supports). The pedestal 12 may have a horizontal footprint which is substantially equal to that of a standardized bulk seed container or box. The pedestal 12 may have a front 14, a rear 15 which is located opposite of the front, and opposite sides 16, 17 which extend between the front and the rear of the pedestal. In some embodiments, the front 14 may be formed by a front panel 18, the rear 15 may be formed by a rear panel 19, and the sides 16, 17 may each be formed by a respective side panel 20. The pedestal 12 may have a bottom 22 for resting on the container supports of the seed cart, and may be closed or may be generally open.

In some embodiments, the pedestal 12 may have a pair of fork passages 24, 25 which are each configured to receive a fork of a lifting implement, such as a fork lift or forks mounted on a loader apparatus. At least one of the front 18, rear 19 or the opposite side panels 20 may have a pair of fork openings 26, 27 which extend into the pair of fork passages. Each fork passage may extend between the opposite sides of the pedestal or the opposite front and rear of the pedestal. In the illustrative embodiments, each of the front, rear, and side panels is provided with a pair of fork openings. Each of the fork passages 24, 25 may be formed by a fork tube 28 which may extend between the sides or the front and rear. In some implementations, fork tubes may intersect in the pedestal where the tubes cross.

The tank apparatus 10 may also include a tank housing 30 which defines a tank chamber 32 for holding a fluid or liquid, and may be substantially fluid tight. The tank housing 30 may be positioned on and mounted to the pedestal 12 in a relatively permanent manner. The tank housing may be located toward the rear 15 of the pedestal and may extend from one opposite side 16 to the other opposite sides 17 of the pedestal. The tank housing 30 may include a top extent 34, a bottom extent 35, and a perimeter extent 36 which extends between the top 34 and bottom 35 extents and also extends about the tank chamber 32. The bottom extent 35 may be positioned adjacent to the pedestal 12, and the top extent may be oriented substantially parallel to the bottom extent. The perimeter extent 36 may have a rear portion 40, a front portion 41, and opposite side portions 42. The tank housing may also include at least one baffle wall 44 which is positioned in the tank chamber 32 to provide a degree of restriction of fluid movement within the tank during movement of the apparatus on or off the seed cart. The baffle wall 44 may be mounted on the top extent 34 and the bottom extent 35 and may extend substantially parallel to the rear portion of the perimeter extent, as well as the side portions of the perimeter extent.

A fill opening 46 may be provided on the tank housing 30 which is in communication with the tank chamber for filling the chamber with fluid, and may be positioned in the top extent of the tank housing. A fill cap 48 may be removably positioned over the fill opening when the fill opening is not being utilized to put fluid into the tank. The tank housing may also include a gauge assembly 50 which is in communication with the tank chamber for sensing and indicating a fill level of the fluid in the tank. The gauge assembly may be mounted on the top extent 34 of the housing, and may include a float 52 positioned in the tank chamber.

The apparatus 10 may also include an accessory housing 54 which is configured to hold at least one accessory in association with the tank, and may define an accessory compartment 56. In some embodiment, the accessory housing 54 has a top wall 58, a front wall 60, a rear wall 62 and side walls 64, 65 which extend between the front and rear walls. Optionally, the accessory housing may have a bottom wall, although in some implementations the pedestal may form the bottom of the accessory compartment. The front, rear and side walls may extend between the top and bottom walls. The accessory housing may have a base portion 70 which is mounted on the pedestal 12 and has an opening 72 through which accessories may be moved into and out of the accessory compartment 56. The opening 72 is defined by a base edge 74 which may bisect each of the side walls 64, 65, and which may lie in an inclined plane. The base portion 70 may be formed by the rear wall 62 and lower sections 76, 77 of the side walls located below the base edge 74. The accessory housing may also include a lid portion 80 which is mounted on the base portion, and may be movable between an open position providing access to the accessory compartment and a closed position blocking access to the compartment. Illustratively, the lid portion may be movably mounted on the base portion. The lid portion 80 may have a lid edge 82 which rests on the base edge 74 when the lid portion is in the closed position, and may be moved away from the base edge in the open position. The lid portion may be formed by the top wall 58 the front wall 60, and upper sections 84, 85 of the side walls located above the lid edge 82.

In some embodiments, the front wall 60 may have various features, including a hose notch 86 which extends into the front wall from the lid edge 82 to permit a hose to pass out of the accessory compartment 56 when the lid portion is in the closed position. A dispensing nozzle aperture 88 may also be positioned on the front wall for receiving a portion of a dispensing nozzle when the apparatus 10 is in the dispensing configuration. A latch 90 may also be located on the front wall and may be engageable with a catch 91 located on the base portion of the accessory housing. The accessory housing 54 may also include at least one lift actuator 92 which is configured to assist in the movement of the lid portion from the closed position to the open position. In some embodiments, a pair of lift actuators 92, 93 may be employed and positioned adjacent to the respective side walls of the housing. Illustratively, each of the lift actuators may comprise a spring cylinder which is biased into an extended condition.

The portable fluid tank apparatus 10 may also include a dispensing hose 96 which is at least partially positioned in the accessory compartment 56 in the dispensing configuration, and may be substantially entirely positioned within the compartment 56 in the transport configuration. The dispensing hose 96 may be in fluid communication with the tank chamber 32 such that fluid in the tank is able to move into the dispensing hose. The dispensing hose 96 may have a dispensing nozzle 98 which is located at a dispensing end of the hose, and the nozzle 98 may have a valve for controlling fluid flow through the nozzle and thus out of the hose. The dispensing hose may have a length sufficient to extend out of the accessory compartment and through the hose notch 86 in the lid portion. The dispensing hose may be coiled in the accessory compartment of the accessory housing, such as in the transport configuration of the apparatus. Conversely, a significant portion of the dispensing hose may extend through the hose notch and exteriorly of the accessory compartment when the apparatus is in the dispensing configuration. A dispensing pump 100 may be positioned in the accessory compartment of the accessory housing and may be in fluid communication with the dispensing hose and the tank chamber to draw fluid from the tank chamber into and out of the dispensing hose. In some implementations, the dispensing pump 100 of a tank apparatus acting as a master unit may be configured to be able to draw and dispense fluid from the tanks of other tank apparatus acting as slave units.

The apparatus 10 may also include an auxiliary tank assembly 102 which is positionable in the accessory compartment 56 to provide convenient storage for additional fluids, such as for the storage of DEF. The auxiliary tank assembly 102 may include an auxiliary tank 104 which defines an auxiliary chamber which is configured to hold a liquid and may be substantially fluid tight. The auxiliary tank 104 may have an auxiliary fill opening with auxiliary fill cap 106 which is removably mounted on the auxiliary tank over the auxiliary fill opening. At least one mounting strap 108 may be mounted on the base portion of the accessory housing and may extend about a portion of the auxiliary tank in order to help hold the tank 104 in position in the accessory chamber. The auxiliary tank assembly may also include an auxiliary dispensing hose 110 which is in fluid communication with the auxiliary chamber of the auxiliary tank. The auxiliary dispensing hose 110 may have an auxiliary dispensing nozzle 112 at a dispensing end of the auxiliary dispensing hose. The auxiliary dispensing nozzle may also have a valve for controlling fluid flow through the nozzle 112. The auxiliary tank assembly may further include an auxiliary dispensing pump 114 which may be in fluid communication with the auxiliary dispensing hose and may be configured to draw fluid from the auxiliary chamber of the auxiliary tank into the auxiliary dispensing hose. The auxiliary dispensing pump may be positioned in the accessory compartment 56 of the accessory housing, and in some embodiments may be mounted on the auxiliary tank such that the tank assembly 102 may be removable from the accessory compartment as a unit. Tank assembly 102 may also include an auxiliary nozzle holster 116 which may be mounted on the auxiliary tank in the accessory compartment and may removably receive a portion of the auxiliary dispensing nozzle 112 during times of storage.

The apparatus 10 may also include a power source 120 which is suitable to provide power to various components of the apparatus 10. The power source 120 may include elements on the apparatus, such as elements which are removably positioned in the accessory compartment 56 of the housing 54, and/or may include elements external to the apparatus 10. The power source 120 may be configured to provide power to the dispensing pump, and when included, the auxiliary dispensing pump. The power source may include a battery which may be of the rechargeable type and may be of an automotive type providing, for example, 12 volt DC power. A battery housing 124 may define a battery chamber for removably receiving the battery. The battery housing, as well as the battery, may be positioned in the accessory compartment. The battery housing may include a top portion 126 and a bottom portion 127 such that the battery may be removed from the housing by removing the top portion from the bottom portion to thereby access the battery chamber. The power source 120 may also include elements for receiving power from a source external to the apparatus 10, such as from a generator included on the seed cart or separate from the seed cart, vehicles including an agricultural tractor or a truck, or even a utility grid-based source such as the electrical outlet of a building structure. A charging or power supply port 130 may be provided in electrical communication with the battery for providing power to recharge the battery, or may provide power to the pump or pumps directly without use of any battery. The charging port 130 may be mounted on the accessory housing, and may be located on the front wall 60 of the lid portion of the housing. The power source 120 may also include a charging cord 132 which is removably connectable to the charging port 130 and to a source of electrical power on the seed cart, such as an electrical generator mounted on the seed cart, and electrical connector on the vehicle, or an electrical outlet of the building structure, as various examples.

In some implementations, a hose support hook 136 may be mounted on the seed cart 1 for supporting a loop portion of the dispensing hose 96 in the dispensing configuration of the apparatus mounted on the seed cart.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A portable fluid tank apparatus for removably mounting on container supports for a bulk seed container of a seed cart, the container supports having a peripheral upper surface defining a seed box support position upon which the bulk seed container is rested when the seed box is positioned on the seed cart, the tank apparatus comprising:

a pedestal unit forming a base of the tank apparatus for resting on the container supports of the seed cart in the seed box support position, the pedestal unit having a lowermost surface for resting on the peripheral upper surface of the container supports, the lowermost surface of the pedestal unit extending in a single plane to permit the lowermost surface of the pedestal unit to rest upon the peripheral upper surface of the seed cart, the pedestal unit having a front, a rear and opposite sides;

a storage unit united to the pedestal unit, an entirety of the storage unit being located over the pedestal unit, the storage unit having a front face adjacent the front of the pedestal unit, a rear face adjacent the rear of the pedestal unit, and opposite side faces adjacent the respective sides of the pedestal unit extending between the front and rear faces, the storage unit comprising:

a tank housing defining a tank chamber configured to hold a liquid, an entirety of the tank housing being located over the pedestal unit, the tank housing forming the rear face of the storage unit and first portions of the opposite side faces of the storage unit;

an accessory housing enclosing an accessory compartment, an entirety of the accessory housing being located over the pedestal unit, the accessory housing forming the front face of the storage unit and second portions of the opposite side faces of the storage unit, the accessory housing comprising:

a base portion mounted on the pedestal unit and defining an opening for accessing the accessory compartment, the base portion including a floor having an upper surface forming the lowermost extent of the accessory compartment, the opening of the base portion extending from the floor to an uppermost extent of the accessory compartment;

a lid portion pivotally mounted on the base portion such that an entirety of the lid portion is movable with respect to the base portion between a closed position and an open position, the closed position of the lid portion being characterized by the lid portion covering an entirety of the opening defined by the base portion for restricting access to the accessory compartment through the opening, the open position of the lid portion being characterized by the lid portion being separated from the opening for permitting access to the accessory compartment through the opening; and wherein the entirety of the lid portion is pivotable as a single integral part between the open position and the closed position, the lid portion pivotally rotating about an upper and rearmost edge of the lid portion toward the open position such that a forward and lowermost edge of the lid portion swings upwardly and outwardly in a forward direction with respect to the opening of the base portion as the lid portion moves from the closed position toward the open position;

at least one accessory associated with the storage unit, the at least one accessory being mountable on the front face of the storage unit when the lid portion is in the closed position, the at least one accessory being removable from the front face of the storage unit to permit moving of the lid portion from the closed position to the open position and moving of the at least one accessory through the opening of the base portion to position the at least one accessory in the accessory compartment of the accessory housing.

2. The apparatus of claim 1 wherein the at least one accessory comprises a dispensing hose at least partially positioned in the accessory compartment of the accessory housing, the dispensing hose being in fluid communication with the tank chamber of the tank housing, the dispensing hose having a length sufficient to extend out of the accessory compartment.

3. The apparatus of claim 2 additionally comprising a dispensing pump positioned in the accessory compartment of the accessory housing and being in fluid communication with the dispensing hose and the tank chamber of the tank housing to move fluid from the tank chamber into the dispensing hose.

4. The apparatus of claim 1 wherein the at least one accessory comprises a power source positioned in the accessory compartment of the accessory housing.

5. The apparatus of claim 4 wherein the power source is configured to provide power to a dispensing pump in fluid communication with the tank chamber of the tank housing.

6. The apparatus of claim 5 wherein the power source includes a rechargeable battery.

7. The apparatus of claim 5 wherein the power source includes a charging port in electrical communication with the dispensing pump and a charging cord removably connectable to the charging port and a source of electrical power on the seed cart.

8. The apparatus of claim 1 wherein the at least one accessory comprises an auxiliary tank assembly positionable in the accessory compartment, the auxiliary tank assembly including an auxiliary tank defining an auxiliary chamber configured to hold a liquid.

9. The apparatus of claim 8 wherein the auxiliary tank assembly additionally comprises an auxiliary dispensing hose in fluid communication with the auxiliary chamber of the auxiliary tank and an auxiliary dispensing nozzle at a dispensing end of the auxiliary dispensing hose and having a valve for controlling fluid flow through the nozzle.

10. The apparatus of claim 9 wherein the auxiliary tank assembly additionally comprises an auxiliary dispensing pump being in fluid communication with the auxiliary dispensing hose and being configured to draw fluid from the auxiliary chamber of the auxiliary tank into the auxiliary dispensing hose.

11. The apparatus of claim 10 wherein the auxiliary tank assembly additionally comprises an auxiliary nozzle holster mounted on the auxiliary tank for removably receiving a portion of the auxiliary dispensing nozzle.

12. The apparatus of claim 1 wherein the tank housing and the accessory housing collectively have an exterior surface with a height, a width, and a depth, the magnitude of the height, the width, and the depth each being such that the exterior surface has a cubic shape.

13. The apparatus of claim 1 wherein the tank housing and the accessory housing each have an exterior surface having an exterior shape with a height, a width, and a depth, the height, width, and depth of the exterior shape of the tank being the same as the respective height, width, and depth of the exterior shape of the accessory housing.

14. The apparatus of claim 1 wherein the accessory housing has an exterior surface, a section of the exterior surface on the base portion of the accessory housing having a height, a width, and a depth, a section of the exterior surface on the lid portion of the accessory housing having a height, a width, and a depth, the height, width, and depth of the exterior surface on the base portion being substantially equal to the height, width, and depth of the exterior surface on the lid portion.

15. The apparatus of claim 1 wherein the tank housing and the accessory housing collectively have a horizontal extent substantially coextensive with a top of the pedestal.

16. The apparatus of claim 1 wherein the lid portion includes an entirety of a front wall and an entirety of a top wall of the accessory housing to facilitate access to the accessory compartment through the opening defined by the base portion of the accessory housing.

17. The apparatus of claim 1 wherein the lid portion has a perimeter edge positionable against the opening defined by the base portion, the perimeter edge of the lid portion defining a notch permitting a dispensing hose to extend from the accessory compartment to an exterior of the accessory housing when the lid portion is in the closed position.

18. A portable fluid tank apparatus for removably mounting on container supports for a bulk seed container of a seed cart, the tank apparatus comprising:
a pedestal forming a base of the tank apparatus for resting on the container supports of a seed cart in a seed box support position, the pedestal including a perimeter frame extending in a horizontal plane and having a rectangular shape with four sides, each of the four sides of the perimeter frame of the pedestal defining a side plane extending vertically upwardly from the respective side to collectively define a space over the pedestal;
a tank housing mounted on the pedestal and defining a tank chamber capable of holding a liquid, the tank housing being located within the space defined by the side planes of the four sides of the perimeter frame of the pedestal;
an accessory housing mounted on the pedestal and enclosing an accessory compartment to selectively hold at least one accessory, the accessory housing being located within the space defined by the side planes of the four sides of the perimeter frame of the pedestal, the accessory housing comprising:
 a base portion mounted on the pedestal and defining an opening for accessing the accessory compartment, the base portion including an entirety of a rear wall and a bottom wall of the accessory housing; and
 a lid portion mounted on the base portion and being movable with respect to the base portion between a closed position restricting access to the accessory compartment through the opening and an open position permitting access to the accessory compartment through the opening, the lid portion including an entirety of a front wall and a top wall of the accessory housing; and
wherein the base portion includes spaced side walls extending between the front, rear, top and bottom walls of the accessory housing; and
wherein the side walls of the accessory housing are diagonally bisected by an edge forming the opening on the base portion such that lower sections of the side walls extending between the bottom wall and the rear wall form a part of the base portion and upper sections of the side walls extending between the front wall and the top wall form a part of the lid portion.

19. A portable fluid tank apparatus for removably mounting on container supports for a bulk seed container of a seed cart, the tank apparatus comprising:
a pedestal forming a base of the tank apparatus for resting on the container supports of the seed cart in a seed box support position;
a tank housing defining a tank chamber configured to hold a liquid, an entirety of the tank housing being located over the pedestal;
an accessory housing enclosing an accessory compartment to selectively hold at least one accessory, an entirety of the accessory housing being located over the pedestal, the accessory housing comprising:
 a base portion mounted on the pedestal and defining an opening for accessing the accessory compartment, the base portion including a floor having an upper surface forming the lowermost extent of the accessory compartment, the opening of the base portion extending from the floor to an uppermost extent of the accessory compartment;
 a lid portion pivotally mounted on the base portion such that an entirety of the lid portion is movable with respect to the base portion between a closed position and an open position, the closed position of the lid portion being characterized by the lid portion covering an entirety of the opening defined by the base portion for restricting access to the accessory compartment through the opening, the open position of the lid portion being characterized by the lid portion being separated from the opening for permitting access to the accessory compartment through the opening; and
wherein the entirety of the lid portion is pivotable upwardly and rearwardly toward the open position and the entirety of the lid portion is pivotable downwardly and forwardly toward the closed position;
wherein the at least one accessory comprises a dispensing hose at least partially positioned in the accessory compartment of the accessory housing, the dispensing hose being in fluid communication with the tank chamber of the tank housing, the dispensing hose having a length sufficient to extend out of the accessory compartment; and
wherein the dispensing hose has a dispensing nozzle at a dispensing end of the dispensing hose, the dispensing nozzle having a valve for controlling fluid flow through the nozzle, the dispensing nozzle being removably attachable to an exterior of the lid portion of the accessory housing.

\* \* \* \* \*